F. L. EAGER.
ARTIFICIAL DENTURE.
APPLICATION FILED JAN. 12, 1920.

1,401,243.

Patented Dec. 27, 1921.

Inventor
Frank L. Eager,
by Arthur Jenkins,
Attorney

UNITED STATES PATENT OFFICE.

FRANK L. EAGER, OF WATERBURY, CONNECTICUT.

ARTIFICIAL DENTURE.

1,401,243. Specification of Letters Patent. Patented Dec. 27, 1921.

Application filed January 12, 1920. Serial No. 350,837.

*To all whom it may concern:*

Be it known that I, FRANK L. EAGER, a citizen of the United States, residing in Waterbury, in the county of New Haven and State of Connecticut, have invented a new and improved Artificial Denture, of which the following is a specification.

My invention relates to the class of devices employed to removably secure artificial teeth in place, and an object of my invention, among others, is to provide an extremely sanitary means for removably but rigidly and securely fastening one or more artificial teeth to a permanent object within the mouth and with a minimum degree of discomfort to the patient.

Forms of devices embodying my invention and in the construction and use of which the objects herein set out, as well as others, may be attained, is illustrated in the accompanying drawings, in which—

Figure 1:
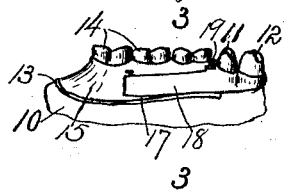
Figure 1 is a back view of a portion of a jaw showing one embodiment of my improved means for securing artificial teeth in in place where there is provision for attachment at one end only.
Figure 2:
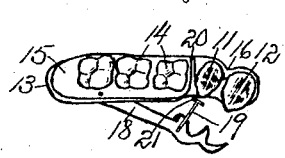
Fig. 2 is a top view of the same, showing the clamp opened to permit removal.
Figure 3:
Fig. 3 is a view in cross section on plane denoted by dotted line 3—3 of Fig. 1.

In the accompanying drawings the numeral 10 indicates a portion of a human gum having two natural teeth 11—12 and with a space next thereto from which three natural teeth have been removed. Figs. 1, 2 and 3 illustrating my invention as applied in one way to replace artificially the removed natural teeth and especially where there are means for attachment at one end only of the space originally occupied by the natural teeth. In this form of my invention I provide an artificial saddle 13, preferably of gold, shaped to fit and be seated upon the gum 10 and to this saddle, as a substitute for the three removed teeth, I secure three artificial teeth 14 in any common and ordinary manner, as by embedding them in a rubber compound 15. A rigid stationary clamp jaw 16 projects from one end of the saddle and is shaped to fit the outer surface of the natural tooth 11 or the teeth 11 and 12. A recess 17 is formed in the side of the saddle to receive one end of a clamp bar 18, the outer end of which is formed to fit the outer surface of the tooth 11 or the teeth 11 and 12. My invention contemplates any suitable means for retaining the clamp bar in said recess so that it may have a clamping action, said bar preferably being pivotally attached to the saddle. A very satisfactory device for securing the saddle and clamping bar in clamped engagement consists of a clamping lever 19 pivotally secured to one of the parts, as to the clamping bar and extending to and engaging within a slot 20 formed in the edge of the opposite member, as the clamp jaw 16, said lever having a clamping head 21 engaging the outer surface of the member containing the slot to prevent the lever from being drawn through said slot, the parts being thus rigidly and securely clamped together and in clamped engagement with a tooth 11 or teeth 11 and 12 or other fixture when they have been pressed toward each other by a force sufficient to enable the head 21 to pass along the outer surface of the jaw 16 in close engagement therewith and the lever 19 to consequently enter the slot 20.

It will be understood that the clamp just described may be modified to embody one or a plural number of artificial teeth and that it may be attached to one or more natural teeth depending upon the strain to be sustained thereby, and that means for removably securing the clamp bar to the stationary bar may be of any suitable sort, my invention residing in any structure in which an artificial tooth saddle and a movable clamping member or bar are provided with means for drawing them toward each other to clamp them in removable engagement with a natural tooth.

Figure 4:
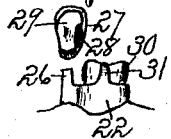
Fig. 4 is a view illustrating a slightly different construction adapted especially for holding a single tooth in place, the artificial tooth being shown as removed from the clamp.
Figure 5:
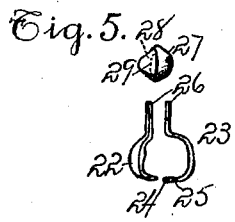
Fig. 5 is a view of the members shown in Fig. 4 in disassembled relation.
Figure 6:
Fig. 6 is a view looking toward the edge of a natural tooth and illustrating the application thereto of the clamping device shown in Figs. 4 and 5.

My invention as embodied in the structure shown in Figs. 4, 5 and 6 comprises two clamping members 22—23 of similar shape formed to fit around an object fixed within the mouth, said members being preferably locked together on one side of a tooth as by interengaging projections 24 and notches 25. The opposite end of the clamping members are extended at an angle to jointly form a post 26 to which a denture is secured, said tooth having a recess 28 formed between the face 27 of porcelain or other material and the back 29 of gold or other metal to receive the post 26, the tooth being pressed downwardly upon the post causing the parts to be closed together and thus firmly clamped about the fixed object, as a natural tooth 30. It is not essential to this form of my invention that the two parts of the clamp shall be interlocked at that edge opposite the post, and neither is it essential that the two clamping members shall be secured in clamped engagement by the artificial tooth, as any other means for removably securing the clamp members together will be within the spirit and intent of my invention. Neither is it essential to this form of my invention that the artificial tooth shall be removably secured to either or both of the clamping members. In cases where there may be a tendency for the clamping members to settle toward the gum I employ a retainer 31 projecting upwardly from one of the clamping members and hooking slightly over the edge of an enlargement on the natural tooth or other fixed object. This will effectually prevent the clamping member being crowded against the gum.

In the form of the device illustrated in Fig. 6 I have shown my improved clamping means as applied to a fixture at each end of the space formerly occupied by the natural teeth. In this form of the device there are two clamping members as hereinbefore described, applied to a tooth or other object from opposite sides and clamping around said tooth, the two members 32 and 33 of each clamp being secured together as by a clamp screw 34. Each of these clamps have a post 35 extending to be received within a socket 36 in the denture 37, the latter comprising a saddle having artificial teeth secured thereto in any suitable manner. My invention illustrated and described herein contemplates a structure comprising a support for artificial teeth which support is intended to rest upon the gum so that all of the masticating forces are against and resisted by the gums, this in contra-distinction to prior devices in which a bridge is anchored at opposite ends to the natural teeth as abutments, which teeth must, therefore, support and resist all of the forces of mastication. It is, therefore, to be seen that these material and principal forces being removed from the fastening means for the denture, special attention need not be paid to the matter of strength in such fastening means.

It will be noted that I have described herein several means for attaching the clamp members one to the other and for drawing them into clamped engagement with each other and with a fixed object within the mouth, and it will be obvious that any of these clamping arrangements may be applied to any of the various structures illustrated and described herein.

In accordance with the provisions of the patent statutes I have described the principles of operation of my invention, together with devices which I now consider to represent the best embodiments thereof; but I desire to have it understood that the devices shown are only illustrative, and that the invention may be carried out by other means:

I claim:—

1. A denture including a saddle having its undersurface smooth and unbroken and shaped to fit and rest upon a gum, rigid, unbending, relatively movable members shaped to fit a tooth, an artificial tooth secured to said saddle, and means for clamping said members in close contact with a tooth to retain said saddle in place.

2. A denture including a saddle having its under surface smooth and unbroken and shaped to fit and rest upon a gum, a rigid, unbending, relatively movable member rigidly secured to said saddle, a rigid relatively movable member movably attached to said saddle, means for clamping said members in firm contact with a tooth, and an artificial tooth supported by said saddle.

3. A denture including a saddle having its under surface smooth and unbroken and shaped to fit and rest upon a gum, a rigid, unbending member rigidly attached to and projecting from said saddle, a rigid, unbending member pivotally attached to said saddle, means for forcing said members toward each other and into engagement with a tooth to retain said saddle in place, and a tooth secured to said saddle.

FRANK L. EAGER.